United States Patent [19]
Liddell et al.

[11] Patent Number: 5,525,658
[45] Date of Patent: Jun. 11, 1996

[54] POLYMER COMPOSITIONS AND PROCESSES

[75] Inventors: John M. Liddell, Stockton on Tees; William Greer, Billingham, both of England

[73] Assignee: Zeneca Limited, London, England

[21] Appl. No.: 374,663

[22] Filed: Jan. 24, 1995

[30] Foreign Application Priority Data

Jul. 24, 1992 [GB] United Kingdom ............ 9215736

[51] Int. Cl.⁶ ...................................... C08K 3/30
[52] U.S. Cl. ............................ 524/418; 524/419
[58] Field of Search ........................ 524/418, 419

[56] References Cited

U.S. PATENT DOCUMENTS 3,325,447  6/1967  Kasparik ........................ 524/419

FOREIGN PATENT DOCUMENTS 69497    1/1983   European Pat. Off. .
7105484  10/1971  Netherlands .

*Primary Examiner*—Tae Yoon
*Attorney, Agent, or Firm*—Cushman Darby & Cushman

[57] ABSTRACT

Melt processed articles of improved color and odor can be produced from hydroxyalkanoic acid polymers if they are melt processed in the presence of a temperature stable sulphite salt, and compositions for use in such processes are disclosed.

11 Claims, No Drawings

POLYMER COMPOSITIONS AND PROCESSES

This invention relates to polymer compositions and processes.

Processes in which poly hydroxyalkanoates especially hydroxybutyric acid polymers and copolymers, for example copolymers of hydroxybutyric acid and hydroxyvaleric acid are microbially produced and separated from the microorganisms for use as plastics materials, are known, for example from European Patents 69,497 and 52,459.

Polymers produced in this way are difficult to separate completely from other organic matter derived from the microorganisms and such organic matter may cause discoloration of the polymer and/or impart an objectionable odour to the polymer during melt processing.

We have found that if the melt processing is carried out in the presence of a temperature stable sulphite salt, preferably an acid sulphite salt, the colour and/or odour of the processed polymer is better than when it is absent.

The invention comprises a plastics composition which comprises a microbially produced hydroxyalkanoic acid polymer and a temperature stable sulphite salt.

The polymer preferably comprises at least 90% and preferably at least 90% of hydroxyalkanoic acid residues by weight and more preferably comprises substantially only hydroxyalkanoic acid residues. The hydroxyalkanoic acid residues suitably contain 4 to 12 carbon atoms and may be for example hydroxybutyric and/or hydroxyvaleric acid residues.

By temperature stable is meant a salt which is sufficiently stable for an effective amount to be present after the composition has been raised to a temperature at which it is melt processed. It is believed that the salt reacts with impurities when the polymer is in the molten state, thereby achieving the desired results. In general, compounds of which at most 10% decompose when exposed to a temperature of about 150° C. for a period of 0.5–10 minutes can be expected to be satisfactory when melt processing is to take place in the range 170° to 210° C.

The sulphite is preferably an alkali metal for example a lithium or preferably sodium or potassium sulphite salt, and is more preferably an alkali metal acid sulphite for example sodium bisulphite.

The quantity of sulphite salt required depends on the amounts and character of the impurities present, on the nature of the salt and its stability (which influences the amounts present at melt processing temperatures). However, concentrations equivalent to 0.1 to 1% and preferably 0.1 to 0.5% by weight of sulphur present in the form of sulphite are in general suitable.

The sulphite may be incorporated into the composition for example by mixing the salt with the polymer as powder or preferably by contacting a solution of the salt with the polymer preferably in a high surface area form having for example a surface area of 1 to 10 sq.m per gram and drying. If desired however it may be introduced in the course of heating the polymer to melt processing temperatures or during the manufacture of the polymer. In the latter case, if the polymer is subjected to a oxidative bleaching stage the sulphite salt should be added after that stage and preferably after consumption or removal of the bleach in order to prevent oxidation of the sulphite salt by the bleach which leads to excessive consumption of sulphite.

The invention also comprises a process for the production of shaped articles which comprises melt processing a composition as aforesaid.

By melt processing is meant shaping the polymer at a temperature at which it is formable. Typically such temperatures are in the range 130°–210° C.

The invention also comprises shaped articles, for example sheet, film, rods, fibres, fabrics, filters, containers and surgical devices formed from compositions as aforesaid by a process which comprises melt processing. Such articles may if desired contain residual sulphite salt to confer further protection against discoloration especially if they are to be exposed to elevated temperatures.

EXAMPLE 1

Addition of Sodium Metabisulphate Solution

A dried sample of a commercially available microbially produced copolymer of hydroxybutyric acid and hydroxyvaleric acid (4% molar hydroxyvalerate) sold under the trade mark "BIOPOL" by Imperial Chemical Industries PLC was mixed with a 0.5% w/v aqueous solution of sodium metabisulphite ($Na_2S_2O_5$) (10 ml of sodium metabisulphite solution to 10 g of the hydroxybutyrate/hydroxyvalerate copolymer). The copolymer slurry containing sodium bisulphite solution was dried in an oven at 60° C. for 16 hours. A second sample was similarly heated in the absence of the solution. Sample copolymers with and without the addition of sodium metabisulphite were melt processed at 170° C. with a melt residence time of 4.0 minutes. The colour of the resulting polymer samples were measured by ASTM method D1925-70 to be 66 yellowness units for the untreated polymer sample and 46 yellowness units for the polymer containing sodium metabisulphite.

EXAMPLE 2

Addition of Sodium Metabisulphite Crystals

A dry sample of microbially produced copolymer of hydroxybutyric acid and hydroxyvaleric acid as in Example 1 was mixed with crystalline solid sodium metabisulphite ($Na_2S_2O_5$) (50 mg sodium metabilsulphite crystals were added to every 10 g of copolymer). Polymer samples were melt processed at 170° C. with a melt residence time of 4.0 minutes. The colour of the resulting polymer samples were measured by ASTM methods D1925-70 to be 66 yellowness units for untreated polymer and 48 yellowness units for the polymer containing sodium metabisulphite.

EXAMPLE 3

A dry sample of microbially produced copolymer of hydroxybutyric acid and hydroxyvaleric acid as in Example 1 was mixed with a 1% w/v solution of sodium sulphite ($Na_2SO_3$) (10 ml of sodium sulphite solution to 10pm of hydroxybutyrate/hydroxyvalerate copolymer). The copolymer slurry containing the sodium sulphite solution was dried in an oven as in Example 1. Sample copolymers with and without the addition of sodium sulphite were melt processed at 170° C. with a melt residence time of 4.0 minutes. The colour and the resulting polymer samples were measured by ASTM method D1925-70 and found to be 59 yellowness units for untreated polymer sample and 42 yellowness units for the polymer containing sodium sulphite.

We claim:

1. A plastics composition which comprises a microbially produced hydroxyalkyanoic acid polymer and between 0.1 and 1.0% by weight of sulphur in the form of a temperature stable alkali metal sulphite.

2. A composition as claimed in claim 1 in which the polymer comprises hydroxybutyric acid and/or hydroxyvaleric acid residues.

3. A plastics composition which comprises a microbially produced hydroxyalkanoic acid polymer and a temperature stable alkali metal sulphite.

4. A composition as claimed in claim 3 in which the sulphite salt is sodium or potassium bisulphite.

5. A composition as claimed in claim 4 in which 0.1 to 1.0% by weight of sulphur in the form of sulphite is present.

6. A process of making a composition as claimed in any one of claims 1, 2, and 4 which comprises mixing a solution of the salt with polymer and drying.

7. A composition according to claim 1 wherein the amount of sulphite included is sufficient to improve at least one of color and odor of the polymer when melt processed.

8. A process of producing shaped articles from a microbially produced hydroxyalkanoic acid polymer which comprises melt processing the polymer in the presence of between 0.1 and 1.0% by weight of sulphur in the form of a temperature stable alkali metal sulphite.

9. Shaped articles of improved colour and/or odour formed by the process of claim 8.

10. Shaped articles according to claim 9 which contain residual sulphite salt.

11. A process according to claim 8 wherein the amount of sulphite included is sufficient to improve at least one of color and odor of the polymer when melt processed.

* * * * *